United States Patent [19]

Gould et al.

[11] Patent Number: 4,909,870

[45] Date of Patent: * Mar. 20, 1990

[54] METHOD OF AND APPARATUS FOR ATTACHING CONTINUOUSLY RUNNING FASTENER STRIP TO WEB SUBSTRATE

[75] Inventors: Russell J. Gould, Mount Prospect, Ill.; Richard D. Brown, Erie, Pa.

[73] Assignee: Minigrip, Inc., Orangeburg, N.Y.

[*] Notice: The portion of the term of this patent subsequent to Dec. 16, 2003 has been disclaimed.

[21] Appl. No.: 212,117

[22] Filed: Jun. 27, 1988

Related U.S. Application Data

[63] Continuation of Ser. No. 894,668, Aug. 8, 1986, abandoned.

[51] Int. Cl.⁴ .................... A44B 19/14; B29C 65/08; B29C 65/10
[52] U.S. Cl. ..................... 156/66; 156/73.1; 156/178; 156/309.9; 156/320; 156/497; 156/554; 156/555
[58] Field of Search .............. 156/66, 322, 320, 309.9, 156/321, 324, 82, 497, 499, 554, 555, 176, 178, 73.1; 493/381, 191, 192, 197; 383/63, 65, 95

[56] References Cited

U.S. PATENT DOCUMENTS

| Re. 29,208 | 5/1977 | Naito | 156/91 |
|---|---|---|---|
| 2,398,398 | 4/1946 | Abbott | 156/82 X |
| 2,898,973 | 8/1959 | Marsh | 156/309.9 X |
| 3,130,647 | 4/1964 | Anderson et al. | 156/582 X |
| 3,210,227 | 10/1965 | Schichman | 156/497 |
| 3,462,332 | 8/1969 | Goto | 156/244 |
| 3,532,571 | 10/1970 | Ausnit | 156/91 |
| 3,773,580 | 11/1973 | Provost | 156/66 |
| 3,784,432 | 1/1974 | Noguchi | 156/244 |
| 3,948,705 | 4/1976 | Ausnit | 156/73.4 |
| 3,951,050 | 4/1976 | Poole | 493/192 |
| 3,959,567 | 5/1976 | Bradley | 156/497 X |
| 4,101,355 | 8/1978 | Ausnit | 156/66 |
| 4,259,133 | 3/1981 | Yagi | 156/244.11 |
| 4,279,677 | 7/1981 | Takahashi | 156/160 |
| 4,306,924 | 12/1981 | Kamp | 156/66 |
| 4,341,575 | 7/1982 | Herz | 156/66 |
| 4,355,494 | 10/1982 | Tilman | 53/416 |
| 4,411,644 | 10/1983 | Tinklenberg | 493/213 |
| 4,430,070 | 2/1984 | Ausnit | 493/215 |
| 4,601,694 | 7/1986 | Ausnit | 493/381 |
| 4,617,683 | 10/1986 | Christoff | 383/65 X |
| 4,629,524 | 12/1986 | Ausnit | 156/66 |
| 4,673,383 | 6/1987 | Bentsen | 156/66 |

FOREIGN PATENT DOCUMENTS

| 1546433 | 5/1979 | United Kingdom . |
|---|---|---|
| 1587609 | 4/1981 | United Kingdom . |
| 2080412A | 2/1982 | United Kingdom . |

Primary Examiner—Michael W. Ball
Assistant Examiner—Steven D. Maki
Attorney, Agent, or Firm—Hill, Van Santen, Steadman & Simpson

[57] ABSTRACT

A method of and apparatus for attaching a rapidly continuously running substrate web and a corunning separable fastener strip having an attachment base surface carrying a dormant reactivatable adhesive which is reactivated and the fastener strip and the web pressed into firmly adhesively bonded relation.

8 Claims, 1 Drawing Sheet

U.S. Patent   Mar. 20, 1990   4,909,870
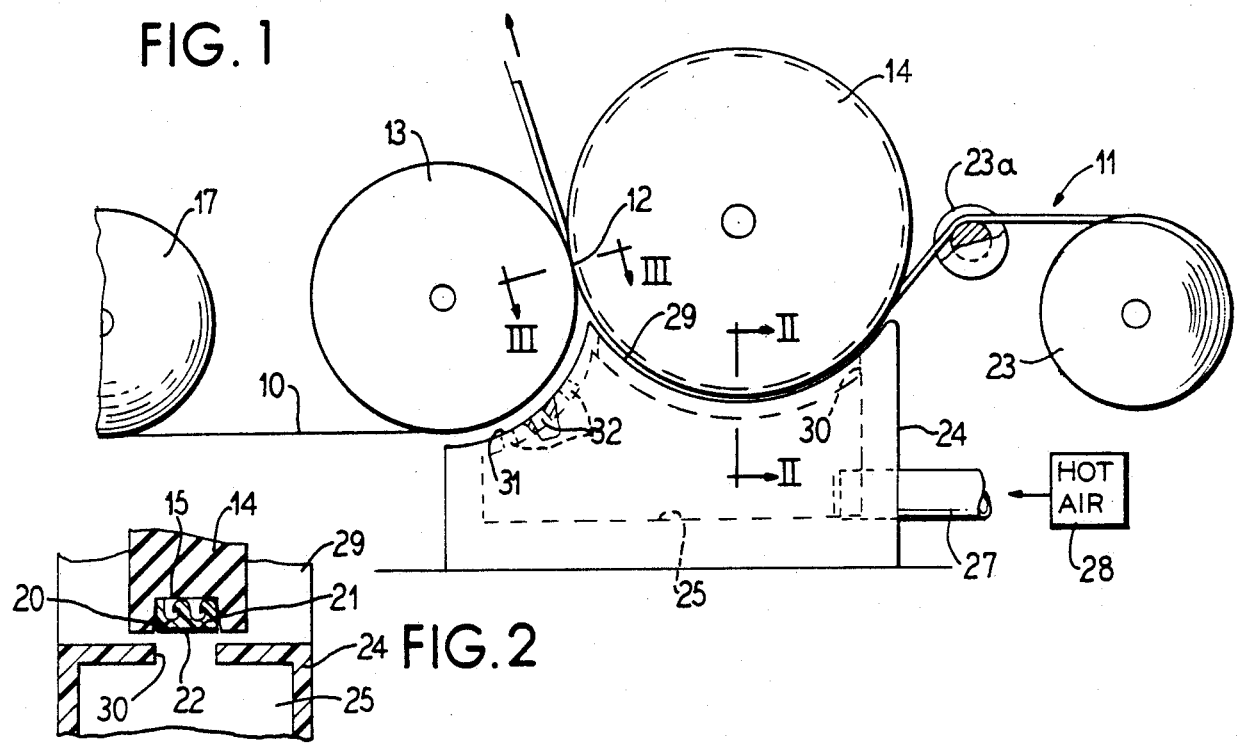
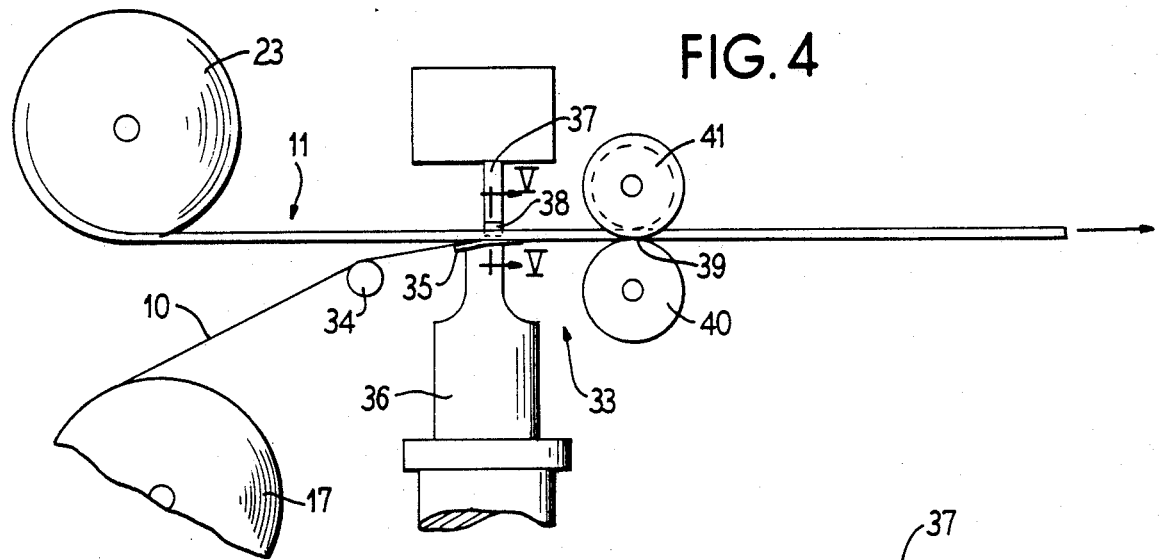
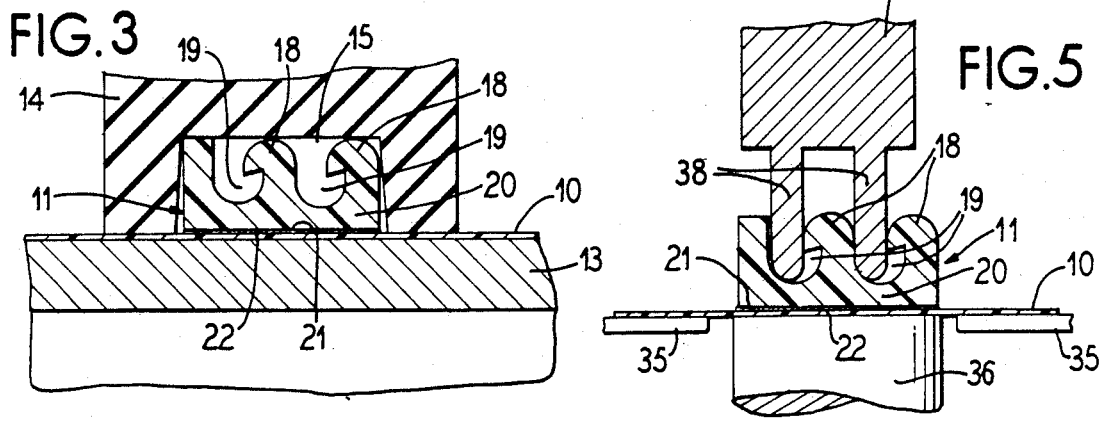

METHOD OF AND APPARATUS FOR ATTACHING CONTINUOUSLY RUNNING FASTENER STRIP TO WEB SUBSTRATE

This is a continuation of application Ser. No. 894,668 filed Aug. 8, 1986 now abandoned.

BACKGROUND OF THE INVENTION

This invention relates to the attachment of separable fastener strip to web substrate, and is especially useful for producing bag-making material in which plastic film carries extruded plastic separable fastener means in strip form.

As revealed in the prior art exemplified by U.S. patents, proposals for uniting extruded separable fasteners, sometimes referred to in the trade as zippers, have comprised joining the fastener profile strips to a compatible extruded synthetic plastic film substrate while both of the separately, but simultaneously extruded components are still in a sufficiently plastic state to fuse together, as exemplified in U.S. Pat. Nos. 3,462,332 ,4,259,133 and Re.29,208.

Another technique, as exemplified in U.S. Pat. Nos. 3,784,432 and 4,279,677, includes joining the freshly extruded profile strips to compatible prefabricated plastic film substrate while the fastener strip is still in a sufficiently thermoplastic state to permit fusing the thermoplastic film which is reheated from a cold state to accelerate the fusion.

A further technique as exemplified in U.S. Pat. No. 3,532,571 includes joining freshly extruded film to compatible prefabricated fastener strips while the film is still in a sufficiently thermoplastic state to permit fusing the fastener strip to the film.

It has, of course, been longtime common practice to join prefabricated fastener strip to prefabricated compatible plastic film by fusion welding, as exemplified in U.S. Pat. No. 3,948,705, and suggested in British Patent No. 1,587,609. This British patent also has a bare suggestion of adhesive attachment of the strip.

A distinct advantage attributable to prefabricating profile fastener strips and bag making plastic film resides in the fact that because of the relatively larger section modulus of the profile strips as compared to the section modulus of the plastic film, the plastic film when extruded separately can be run at a much greater speeds than the profile fastener strips. Therefore, by spooling the prefabricated fastener strips and the prefabricated film in separate rolls, they can be fed simultaneously at desired speed and joined together as by means of adhesive applied in a fluent state between the elements as they are brought convergently together, as exemplified, by U.S. Pat. Nos. 4,101,355; 4,341,575 and 4,355,494. By such prefabrication and then adhesive joinder of the profile fastener strips and the substrate, relatively incompatible materials may be utilized to advantage in the respective elements. For example, a form of plastic material which will lend itself to best advantage for extrusion of the profile strips, and will afford the most advantageous elastic deformation separable coaction of the fastener profiles, may be utilized for that purpose, while materials having special characteristics desirable for the end product such as bags may be utilized in the film whether plastic or non-plastic. The composite finished product will then be endowed with all of the preferred characteristic in both the fastener and the substrate.

With all of the advantages inherent in adhesively securing prefabricated elastically deformable separable profile fastener strips to prefabricated film substrate, there is still room for substantial improvement in the adhesive attachment technique. A disadvantage of adhesive attachment as heretofore proposed has been the requirement for extremely accurate control of the fluent adhesive, both as to volume at point of application, temperature gradients during application, tackiness, machine down time, necessarily close attention to the adhesive applicators, avoidance of adhesive spray machine foul-up, and the like. Therefore, on-site adhesive joinder of the profile fastener strips and the substrate has placed a heavy burden on the machine operators to maintain all of the critical parameters necessary for successful results. This has been particularly the case when the adhesive attachment is combined with a form-fill operation as described in U.S. Pat. No. 4,355,494, where the advantage of shipping finished film and fastener separately and thereby saving space, and the advantage of reducing spool changeover because of the larger spools, are then lost due to the relatively complex adhesive applying operation.

In the copending application of Russell J. Gould, Ser. No. 894,669, now U.S. Pat. No. 4,731,911 filed of even date herewith, and assigned to the same assignee, is disclosed a substantial improvement in supplying web-free fastener strips with reactivatable adhesive.

The disclosure in U.K. patent application No. 2,080,412A suggests that the heat reactivatable adhesive carried by the fastener strips be reactivated by employing the conventional heating and pressing jaws or bars commonly used to weld strips to the synthetic material for bags. This involves a stop and start technique.

The beforementioned U.S. Pat. No. 3,948,705 discloses a welding technique utilizing continuous heat or ultrasonic sealing means whereby side flanges on the fastener strip are welded to the substrate.

In copending U.S. Pat. No. 4,430,070 and 4,601,194 of Steven Ausnit, is disclosed the technique of fusion welding of the plastic film to the fastener strip base by means of hot air or radiant heat.

However, none of the disclosures hereinabove discussed provides method and means for high speed, mass production attachment of web and separable fastener strip from a cold state by means of reactivatable adhesive carried by the fastener strip base.

SUMMARY OF THE INVENTION

It is accordingly an important object of the present invention to overcome the disadvantages, drawbacks, inefficiencies, limitations, shortcomings and problems inherent in prior expedients and arrangements for attachment of prefabricated web and prefabricated fastener strip, and to provide a new and improved method and means which will accomplish attachment of the web and fastener strip at high speed in mass production.

To this end, the present invention provides a method of attaching to a rapidly running substrate web a corunning separable fastener strip having an attachment base surface facing the web and carrying a dormant reactivatable adhesive, comprising reactivating said adhesive on the continuously advancing strip base surface, and pressing said continuously advancing web and fastener strip together so that in said pressing the reactivated adhesive effects a thorough bonding of said fastener strip base surface to said web.

The present invention also provides new and improved apparatus for practicing the method.

BRIEF DESCRIPTION OF THE DRAWINGS

Other objects, features and advantages of the present invention will be readily apparent from the following description of certain representative embodiments thereof, taken in conjunction with the accompanying drawing, although variations and modifications may be effected without departing from the spirit and scope of the novel concepts embodied in the disclosure, and in which:

FIG. 1 is a schematic side elevational view of apparatus for effecting high speed joinder and attachment of web and fastener strip according to the present invention;

FIG. 2 is an enlarged fragmentary sectional detail view taken substantially along the line II—II in FIG. 1;

FIG. 3 is an enlarged fragmentary sectional detail view taken substantially along the line III—III in FIG. 1;

FIG. 4 is a schematic side elevational view of a modified arrangement for practicing the invention; and FIG. 5 is an enlarged fragmentary sectional elevational view taken substantially along the line V-V in FIG. 4.

DETAILED DESCRIPTION

Referring to FIG. 1, a rapidly running substrate web 10 and a corunning separable fastener strip 11 are joined and pressed together by means comprising a nip 12 between pinch rolls 13 and 14. About one third the perimeter of the roll 13 is wrapped by the web 10 as guided into the nip, and at least one third the diameter of the roll 14 is wrapped by the fastener strip 11 guided into convergence with the web in the nip 12.

By preference, the roll 13 is formed from a heat conductive material such as aluminum and is of a length which generally corresponds to the width of the web 10. On the other hand, the roll 14 is desirably formed from a heat insulative material such as rubber, preferably a durable synthetic material, and of a length sufficient to accommodate a guide groove 15 (FIGS. 2 and 3) in which the fastener strip 11 is received and guided with reasonable accuracy to the particular longitudinal area of the web 10 to which the fastener strip is to be attached.

Although the particular material of the web 10 may be plastic or non-plastic, the present invention is especially suitable for use in producing bag-making material, utilizing any suitable single layer or laminated plastic material or laminates of plastic and non-plastic material. A supply of the web 10 may be derived from any suitable source such as a supply roll 17 into which the prefabricated web was wound at its point of manufacture. The material for the film web 10 may be selected from any of a number of suitable thermoplastic materials such as polyethylene, polypropylene, polyester, and the like having various melting points ranging from 230° F. to 450° F. The supply roll 17 is mounted rotatably near the pinch roll 13 and the web is directed therefrom tangentially toward the roll 13.

The fastener strip 11 comprises a plastic extrusion having separable fastener profile means which in one desirable form comprises a plurality of longitudinally extending hook-like resiliently flexible ribs 18 and complementary grooves 19, enabling the strip to be separably interlocked with a like strip by pressing the profiles into interengaged relation.

In a preferred construction, the fastener strip 11 is free from lateral flanges and with a strip body 20 carrying the profiles 18 and having a base surface 21 which is in back of and aligned with the profiles and carries dormant reactivatable adhesive 22 uniformly therealong. The adhesive 22 may be in a layer extending from side-to-side and throughout the length of the fastener strip 11, but may also be in multiple stripe or other desirable arrangement along the length of the strip.

Preferred thermoplastic materials from which the profile strip 11 may be extruded comprise polyethylene having a melting point of from 230° F. to 270° F., polypropylene having a melting point on the order of 345° F., and the like. On the other hand, the reactivatable adhesive 22 may be a so-called hot melt adhesive selected from ethylene vinyl acetate, ethylene acrylic acid, polymer rubber resin blend, and the like, having a selected bonding fusion, i.e. reactivating heat range of from 175° F. to 260° F. The bonding fusion temperature of the adhesive should be sufficiently less than the melting point of the selected fastener profile strip material to permit bonding fusion of the adhesive 22 from a cold generally dormant condition by application thereto of heat at a temperature which will not cause softening deformation or any other deterioration of the plastic material of the fastener profile strip, nor softening deformation or any other deterioration of the plastic material or other material of the web 10. By reason of the cold, dormant nature of the adhesive 22 on the prefabricated fastener strip 11, the strip is adapted to be wound into a storage and handling roll 23 that is designed to accept up to 10,000' to 15,000' of fastener whereby to provide a significant length uninterrupted running interval for high speed continuous attachment of the fastener strip 11 to the web 10. The fastener strip roll 23 is desirably rotatably mounted adjacent to the pinch and guide roll 14 for guidance of the strip 11 by a grooved roller 23a to the roll 14.

Driving of one or both of the rolls 13 and 14 at a common peripheral speed may be effected in any well known manner. By having the roll 14 formed from a friction material and pressing against the web 10, and pressing the fastener strip 11 against the web 10 at the nip 12, there is assurance of synchronous advancing movement of the web 10 and the fastener strip 11 from the rolls on which they are respectively wrapped.

An important feature of the present invention resides in the reactivation of the adhesive 22 from its relatively cold, dormant state into its relatively fused adhesive state upstream adjacent to the joining and pressing together of the web and fastener strip at a corunning speed of several hundred feet a minute, so that in the joining and pressing the reactivated adhesive will thoroughly bond the base 21 which faces the web 10 to the continuously corunning web.

In a desirable arrangement, reactivation of the adhesive 22 is adapted to be effected by means of hot air applied thereto by an applicator 24 having a hot air chamber 25 (FIGS. 1 and 2) into which hot air is adapted to be delivered through a conduit 27 from a suitable hot air generator 28. For efficient, high speed application of the hot air, the applicator 24 has a concave wall 29 which is formed on an arc complementary to a substantial segment of the perimeter of the fastener strip advancing and guiding pressure roll 14 adjacently upstream from the pressure nip 12. In the wall 29 is provided an air slot or elongate orifice 30 desirably of a width about the same as the width of the adhesive carrying strip base 21 and aligned with the groove 15 so that hot air from the chamber 25 will impinge the adhesive 22 and reactivate the adhesive. In certain instances a series of orifices positioned one after another can be used instead of a continuous slot. As best seen in FIG. 1, the applicator orifice 30 extends throughout most of the length of the wall 29, and the downstream end of the wall 29 as well as the downstream and of the applicator orifice 30 is located as close as practicable to the pressure nip 12. Therefore, at high speed efficient reactivation of the adhesive 22 is attained. By virtue of the Bernoulli effect, the heated adhesive reactivating air moves with the traveling perimeter of the roll 14 and the adhesive 22 toward the nip 12, so that excessive heat at any one place along the travel of the adhesive is not required, but the minimum temperature which will effect adhesive reactivation will efficiently attain the desired results, and at the nip 12 the reactivation of the adhesive will be at its prime. Since the roll 14 is of a heat insulating material, and by having the body of the applicator 24 of a heat insulating hard plastic material, there is minimum heat loss during the Bernoulli effect movement of the adhesive reactivating air after it leaves the orifice 30. A further benefit of having the roll 14 of a heat insulating material is that the fastener strip 11 is protected in the groove 15 from any substantial heating, and at least protected against overheating.

At the same time that the adhesive 22 of the fastener strip 11 is being reactivated, the longitudinal area of the web 10 to which the fastener strip is to be attached may be preheated so as to attain improved adhesion of the reactivated adhesive. By such preheating of the web area any tendency toward premature chilling of the reactivated adhesive 22 on contact with the web at the nip 12 will be avoided in the high speed travel of the web and strip. To this end, the applicator 24 has an arcuate wall area 31 which complements a segment of the perimeter of the roll 13 adjacently upstream from the nip 12 and extending from juncture with the wall 29 upstream, following the curvature of the roll 13. A plurality of hot air impingement orifices 32 in the wall 31 are aligned in a series opposite the longitudinal area of the web 10 to be preheated. To avoid overheating of the web, the space between the wall 31 and the perimeter of the roll 13 is substantially greater than the relatively close spacing of the wall 29 adjacent to the perimeter of the roll 14. Since the roll 13 is formed from a heat conducting material, the selective preheating of the longitudinal surface of the web 10 which meets and is adhesively attached to the base of the fastener strip 11 will be localized. Beyond the selectively heated longitudinal area of the web the heat sink effect of the roll 13 will maintain the web 10 relatively cool and thus minimize any tendency toward wrinkling. After the web area being preheated leaves the direct hot air impingement range of the orifices 32, the Bernoulli effect momentum of the heated air downstream relative to the surface 31 joins the Bernoulli effect heated air downstream from the surface 29 and thus assures an adequately selectively preheated condition of the longitudinal area of the web 10 at its meeting with the preheated adhesive-carrying base surface 21 of the fastener strip 11 at the nip 12. As the surfaces of the web and fastener strip are pressed together a thorough bonding of their surfaces by means of the reactivated adhesive 22 is attained. On leaving the nip 12, the adhesive bond of the web/fastener assembly rapidly sets and maintains the fastener strip 11 thoroughly bonded to the web 10. The web and fastener strip assembly may then travel directly to a point of use, or may be wound into a roll for future use if preferred.

Another mode of attaching a rapidly running substrate web to a corunning separable fastener strip is exemplified in FIGS. 4 and 5, wherein reactivation of the adhesive 22 is effected by ultrasonic means 33. To this end, the web 10 as fed from the supply roll 17 is directed as by means of a guide roller 34 and supporting and guide plate table 35 into joining with the adhesive carrying base face 21 of the fastener strip 11 as fed from the supply roll 23. At such joining, the combined web and fastener strip pass between an ultrasonic horn 36 and a complementary backup anvil 37 of the ultrasonic means 33. The horn 36 engages the longitudinal bonding area of the web 10. For guiding the fastener strip 11, the backup anvil 37 has guide fingers 38 which engaged within the fastener strip grooves 19 alongside the profile ribs 18 and thereby maintain the rapidly running fastener strip 11 aligned with the ultrasonic horn 36. As the web 10 and the strip 11 pass between the horn 36 and anvil 37, the selected area of the web 10 which is to be bonded to the fastener strip 11 is preheated and the adhesive 22 is reactivated. As closely as practicable downstream relative to the ultrasonic heating means 33, the web and fastener strip assembly run through a bonding nip 39 of pinch rolls comprising a metal, preferably aluminum, roll 40 supporting the web 10, and a grooved combination pressure or pinch and guide roll 41 which engages and guides and presses the fastener strip 11 against the web 10 to complete the reactivated adhesive bonding. Preferably the roll 41 is of rubber, and is driven for advancing the web and fastener strip through the ultrasonic heating means 33 and the rolls 40 and 41 and onward beyond the bonding nip 39 to a point of use or storage.

Although in respect to both of the forms of the invention as depicted in FIGS. 1 and 4, attachment of a typical single fastener strip to the web has been described in detail, it will be appreciated that in the same manner any desired number of the fastener strips may be concurrently attached to the web in providing bag making material.

It will be understood that variations and modifications may be effected without departing from the spirit and scope of the novel concepts of this invention.

We claim as our Invention:

1. A method of attaching to a continuously rapidly advancing prefabricated substrate web of substantial width a corunning separable prefabricated fastener strip having an attachment base surface substantially narrower than said web and facing a nonadhesive face of said web and said strip carrying on said base surface a dormant heat reactivatable adhesive which is reactivatable at a reactivating temperature less than will fuse or detrimentally affect said web and said face, and comprising while said web face and said strip continue rapidly advancing; preheating a narrow longitudinal area of the advancing web and of about the same area width as said strip base surface to no greater than the adhesive reactivating temperature and which temperature is less than the fusion temperature of said web and said face; aligning said strip base surface with said longitudinal web face area; applying said reactivating heat, no greater than said reactivating temperature and less than the fusion temperature of said web face and said fastener strip, to said adhesive on the continuously advancing strip base surface; and pressing said continuously advancing web and fastener strip together between rotary means so that in said pressing the reactivated adhesive effects a thorough bonding of said fastener strip base surface to said web face area, the improvement comprising: running said web and said fastener strip together through ultrasonic heating means and thereby preheating said web in the longitudinal area of the web engaged by said base surface, and reactivating said adhesive by projecting reactivating heat from said ultrasonic heating means through said web to said base surface.

2. A method according to claim 1, which comprises running said corunning web and fastener strip between an ultrasonic horn directed toward the web and a backup anvil which engages and guides said fastener strip.

3. Apparatus for attaching to a continuously rapidly advancing prefabricated substrate web of substantial width a corunning prefabricated separable fastener strip having an attachment base surface substantially narrower than said web and facing a narrow nonadhesive face of said web and said strip carrying on said base surface a dormant heat reactivatable adhesive which is reactivable at a reactivating temperature less than will fuse or detrimentally affect said web, and comprising, means operating while said web and said strip continue rapidly advancing for preheating a narrow longitudinal area of the advancing web face, and of about the same area width as said strip base surface, to no greater than the adhesive reactivating temperature and which temperature is less than the fusion temperature of said web face and said fastener strip, means for aligning said strip base surface with said longitudinal web face area, means for applying heat, no greater than said adhesive reactivating temperature and less than the fusion temperature of said web, to and thereby reactivating said adhesive on the continuously advancing strip base surface; and rotary means located after said heat applying means for both pressing said continuously advancing web and fastener strip together so that in said pressing the reactivated adhesive effects a thorough bonding of said fastener strip base surface to said web face area, the improvement comprising: ultrasonic heating means located for preheating said longitudinal area of the web engaged by said base surface of the strip and thereby transfer adhesive reactivating heat to said adhesive through said web.

4. Apparatus according to claim 3, wherein said ultrasonic heating means comprises an ultrasonic horn directed toward the web and a backup anvil engaging said guiding said fastener strip.

5. Apparatus according to claim 4, comprising a guide plate table supporting said web, said table having an opening therein within which said ultrasonic horn is directed toward said web.

6. Apparatus for attaching to a continuously rapidly advancing substrate web of substantial width a corunning fastener strip having an attachment base surface substantially narrower than said web and facing said web and carrying on said base surface a dormant heat reactivatable adhesive which is reactivatable at a reactivating temperature less than that which will fuse or detrimentally affect said web, and comprising:

a pair of pinch rolls one of which is a heat sink roll and the other of which is a heat insulative roll;

said heat insulative roll having a circumferential groove therein;

a supply of said fastener strip, and means leading said supply to said heat insulative roll and into said groove with said base surface and said reactivatable adhesive facing outwardly from the groove and the remainder of the fastener strip protectively heat shielded within said groove;

a supply of said web leading to and running on said heat sink roll toward and into convergence with said fastener strip running on said heat insulative roll;

a hot air applicator having a hot air chamber and a hot air source communicating with said chamber;

said applicator having a first concave wall formed on an arc complementary to a substantial segment of the perimeter of said heat insulative roll;

said first wall having hot air port means along substantially the length of the arc of said first wall and said port means concentrating hot air onto the reactivatable adhesive on said advancing strip base surface; and said applicator having a second concave wall complementing a segment of the perimeter of said heat sink roll and having hot air directing port means located for localized heating of a narrow area of said web running on said heat sink roll and substantially equal to the width of said fastener strip base so as to preheat said narrow width area of the web, and said narrow width area running into alignment and contact with said fastener strip base at nip of said rolls for thereby being pressed against the reactivated adhesive;

said second wall being spaced from the perimeter of said heat sink roll a substantially greater distance than a relatively close spacing of said first wall relative to the perimeter of said heat insulative roll.

7. Apparatus according to claim 6, wherein said port means in said first wall comprises a continous elongated slot of a width about the same as the width of said adhesive carrying fastener base, and said port means in said second wall comprising a series of individual ports.

8. Apparatus according to claim 6, wherein said grooved roll is a driven roll and operates with said heat sink roll for driving the rolls in synchronism.

* * * * *